Sept. 26, 1967
J. W. HARFORD
RANDOM ACCESS MAGNETIC INFORMATION RETRIEVAL SYSTEM
Filed Dec. 16, 1963
3,344,416
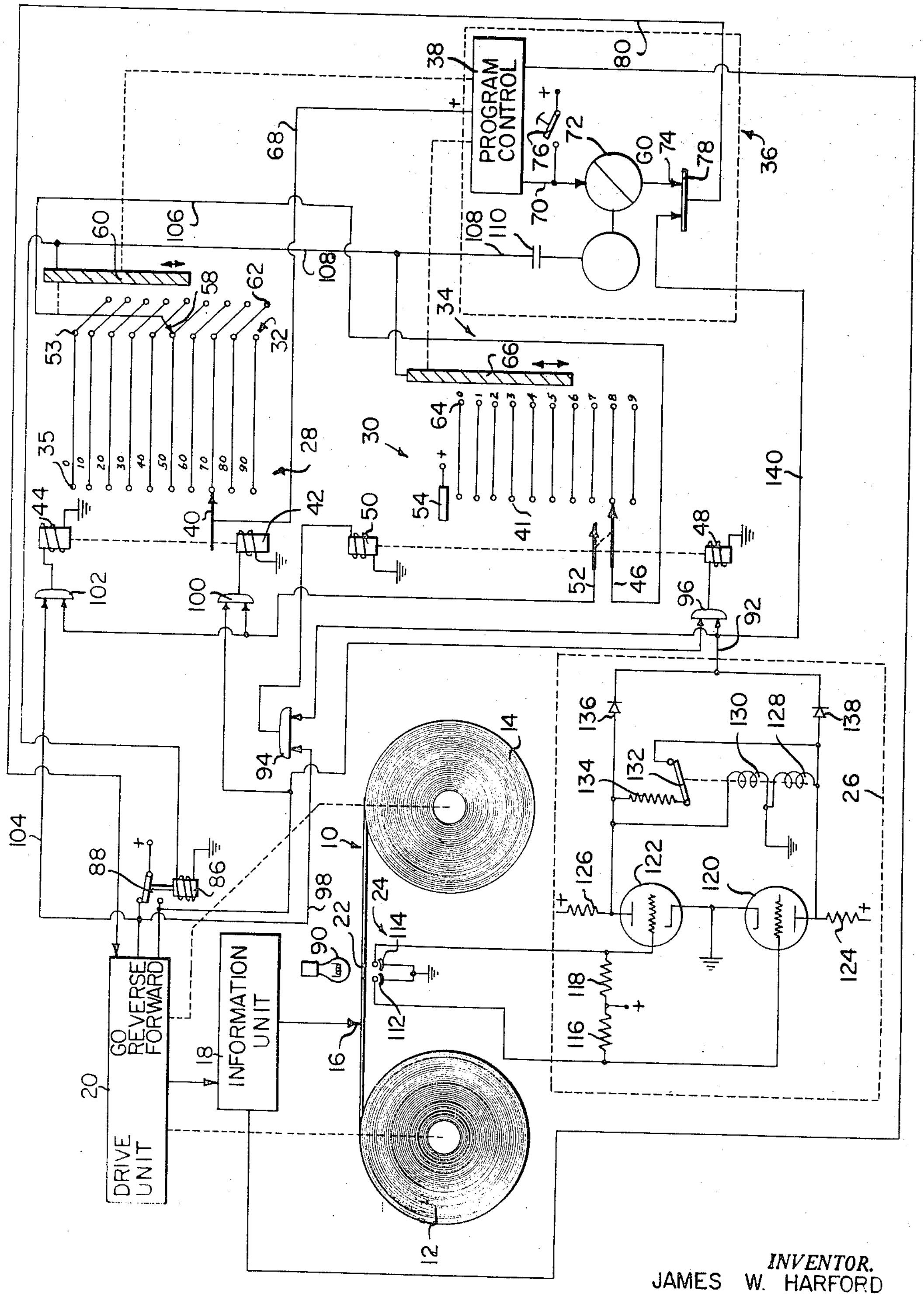
*INVENTOR.*
JAMES W. HARFORD
*BY*
Nelson, Robbins & Anderson
ATTORNEYS 3,344,416
Patented Sept. 26, 1967

3,344,416

RANDOM ACCESS MAGNETIC INFORMATION RETRIEVAL SYSTEM

James W. Harford, 14747 Roscoe Blvd., Panorama City, Calif. 91402

Filed Dec. 16, 1963, Ser. No. 330,788
8 Claims. (Cl. 340—174.1)

ABSTRACT OF THE DISCLOSURE

A location system for retrieving information from a particular location on recording-tape medium that is simply marked. Simple step counters in cooperation with similarly-simple step switches are interconnected to control a tape transport mechanism. The switch structure is set to indicate a desired position and by means of a shorting-bar arrangement functions with the counter structure (indicating current position) to locate the position of the desired information.

The present invention relates to information retrieval systems, and more particularly to a system for use with a recording medium, as magnetic recording tape, which system is capable of efficiently locating selected information recorded on the medium.

Systems capable of registering large quantities of information, e.g. magnetic tape units, often utilize prodigious lengths of recording medium. Generally, intelligence is recorded along the length of the medium which is contained on reels for compact, orderly storage. Normally, access to information so recorded, requires that the section of the recording medium containing the desired information be accessible to move as a single thickness past a sensing transducer, for example, as it is drawn from one reel to another. Therefore, various systems have been proposed for locating and providing available a specific section of recording medium which carries currently desired information. Often, these systems move the recording medium to the location of the desired information at a greater speed than that at which the recording medium is moved during sensing; however, such an arrangement is obviously not necessary, and the speeds may be identical.

In general, various systems for accurately locating a desired section of recording medium, e.g. magnetic tape, have been exceedingly complex and expensive. This consideration is evident, upon realizing the structure involved. Complex registers are usually provided to manifest both the instant position of the recording medium, and the desired position for the recording medium. A part of the system must then compare these positions until coincidence occurs. Of course, the register indicating current position must be informed as the position of the recording medium changes; therefore, signals detected upon movement of the medium are conventionally applied to the register to advance or retard its state. In sensing and applying these signals to accurately control the reels, or other apparatus utilized to handle the recording medium, complex high-precision equipment is also required. That is, if the recording medium is driven at a relatively high speed during searching operations, the moving structure has considerable inertia. The mechanical and electrical apparatus for accurately sensing position signals from the medium and controlling movements of the medium under such circumstances has in the past been quite expensive and complex. Therefore, a need exists for an accurate information retrieval system which is simple and economical to manufacture and use.

In general, the present invention comprises an information retrieval system wherein various information recorded on a medium, as magnetic recording tape, may be specifically selected and provided as desired. More specifically, the system incorporates exceedingly-simple step counters to manifest the position of the tape, and similarly-simple step switches employed in a manner to sense the selected section of the tape and also to indicate the direction-of-travel necessary to reach the tape section. The system also incorporates a pair of transducers to sense indexing or control signals from the tape to provide a degree of tolerance in tape movement, without distorting the manifestations by the control signals.

An object of the present invention is to provide an improved information-retrieval system.

Still another object of the present invention is to provide an information-retrieval system which may be inexpensively manufactured and economically maintained.

Still another object of the present invention is to provide an information-retrieval system for recording medium, which is inexpensive and is capable of accurately locating various sections of the medium.

A further object of the present invention is to provide a system for selectively locating a predetermined section of a recording medium wherein the current position of the recording medium is manifest by a simple register controlled by reliable signals developed through the use of dual transducers and trailing edge utilization.

Still a further object of the present invention is to provide a system which employs economical step counters and shorting, step-switching means whereby to accomplish a simple system for locating predetermined sections of a signal-bearing tape.

These and other objects of the present invention will become apparent from a consideration of the following taken in conjunction with the single figure, which is a diagrammatic representation of a system constructed in accordance with the present invention.

Referring to the figure, there is shown a length of tape 10 which may take various forms, as magnetic recording tape, and is mounted to be transported between a pair of reels 12 and 14. The tape 10 has information recorded thereon which is sensed by a transducer 16 for utilization by an information unit 18.

The tape is segmented, somewhat arbitrarily, so that each section is assigned an identification number. For example, the extreme right end of the tape (on reel 14) may be designated one while sections following to the left are numbered in sequence two, three and so on.

The reels 12 and 14 are mechanically connected to a drive unit 20 which first moves the reels 12 and 14 to position a desired section of the tape 10 for sensing, then drives the reels while information is sensed from the tape 10.

The identifying number for the instant section of tape 10 under the transducer 16, is registered in the system and maintained current by index or position signals formed by windows 22 in the tape 10, passing adjacent a photoelectric-cell circuit 24 that is connected to a logic circuit 26 from which the pulses are provided. Thus a section of tape, identified by number, lies between two of the windows 22, and the occurrence of a position pulse indicates the passage of a window, further indicating the end of the section.

The position pulses from the logic circuit 26 are applied selectively to a pair of step counters 28 and 30 which manifest the current position of the tape 10 in two decimal orders.

The steps counters 28 and 30 are connected in a parallel fashion with a pair of step switches 32 and 34 that are controlled by a program system 36 incorporating a program control unit 38 which is mechanically connected to set the step switches 32 and 34. The program system 36 also includes apparatus to control the drive unit 20 in searching for a desired section of the tape 10.

The step counters 28 and 30 in the figure are electromechanical decade counters. Of course, these units may take a variety of forms as electronic counters or single-tube counters which are capable of providing an output exclusively to one of a plurality of conductors depending upon the state of the counter. Furthermore, the number of stages in the counters may also vary, depending upon the radix of the number system employed.

The counter 28 has a set 35 of ten stationary contact bearing decade indications from zero to ninety whereby to manifest the tens digit indicative of the tape position. A movable contact 40 then selectively engages one of the stationary contacts to provide the output from the counter on one of the ten conductors. An advance coil 42 may be energized to advance the position of the contact 40 while a retard coil 44 steps the position of the contact 40 downwardly in numerical significance.

In the construction of the step counter 28, the energization of the coils 44 and 42 cock a spring-biased stepping mechanism, then upon the deenergization of the coil, the contact 40 is actually moved. That is, no movement of the contact 40 occurs upon the energization of one of the coils 42 or 44; however, the movement of the contact 40 is accomplished when the coil is deenergized. Stepping units of this type are well-known in the prior art.

The structure of the counter 30 is similar to that of the counter 28, including a set 41 of ten stationary contacts designating units from zero through nine, to indicate the units stage of the position of the tape 10. A movable contact 46 in the counter 30 is controlled by an advance coil 48 and a retard coil 50. The step counter 30 also includes a second contact 52 which is mechanically connected to the contact 46, and engages a positive-voltage stationary terminal 54 as the contact 46 passes between the terminals designated zero and nine. In this regard, it is to be noted that although the step counters 28 and 30 are shown in a plane configuration for purposes of explanation, they are of rotary construction so that the terminals designating zero and nine in the step counter 30 lie physically adjacent.

The step switches 32 and 34 associated with the counters 28 and 30 may be similarly constructed and each includes ten stationary terminals. The step switch 32 has a first set 53 of stationary terminals which are engaged individually by a movable contact 58, that is mechanically coupled to a shorting bar 60 which engages a set 62 of contacts. The contacts 53 are connected to the contacts 62 individually in shifted significance by one digit advance. For example, the first of the contacts 53 is connected to the second of the contacts 62 and so on. As a result, when the contact 58 engages a particular stationary contact, e.g. five, the shorting bar 60 engages all the lower-order contacts, e.g. four, three, two, one, and zero.

The step switch 34 is generally similar to the step switch 32; however, includes only a set 64 of contacts that are stationary and are engaged by a shorting bar 66. Of course, the step switches 32 and 34 may take the form of various other structures, as a shorting series of diodes, or various other electrical and electronic shorting-switch systems.

In view of the above introductory considerations of the system of the figure, the actual operation of the system may now best be understood by assuming certain initial conditions and explaining the sequence of events simultaneously with the introduction of elements not previously considered. Therefore, assume initially that it is desired to locate a section on the tape 10 designated fifty-six. To accomplish that selection, the program control unit 38 is operated manually or otherwise to set the switches 32 and 34 in the positions as shown so that the movable contact 58 engages the terminal in the set 53 which indicates five (ten digit) while the highest order terminal in the switch 34 engaged by the shorting bar 66 manifests six. Thus, section 56 is called for.

The setting of the switches 32 and 34 and subsequent control operations may be accomplished manually: however, assuming automatic operation, the program control unit next supplies a positive voltage through a conductor 68 to the movable contact 40 of the step counter 28. Assuming the movable contact 40 engages the terminal designated seventy (as shown in the drawing), there is no effect, because the terminal is not now connected to either the movable contact 58 or the shorting bar 60 in the step switch 32.

Next, the program control unit 38 supplies a pulse through a conductor 70 to a flip-flop circuit 72 (symbolically represented) which upon receipt of an input pulse through the conductor 70 provides a continuing high level of a two-state signal to a conductor 74. The flip-flop circuit 72 may also be set by closing a manual switch 76 connected to a source of positive potential. The high level output provided by the set state of the flip-flop 72 is applied through an or gate 78 to a conductor 80 which carries the signal to the drive unit 20 commanding the drive unit to GO, i.e. move the reels 12 and 14.

The direction in which the drive unit moves the reels 12 and 14 depends upon the position of the step switches 32 and 34 relative to the position of the tape 10 as manifest by the step counters 28 and 30. That is if the desired section of tape is lower than the currently-available tape section, a backward movement is commanded. In the assumed situation, the current section of tape 10 as indicated by the step counters 28 and 30 is seventy-eight; however, the desired section, indicated by the step switches 32 and 34, on section fifty-six. Therefore, the drive should retard or move the tape backward from the reel 14 onto the reel 12 until the section numerically designated fifty-six is presented for sensing.

To fulfill this requirement a relay coil 86 (adjacent the drive unit) controlling direction of motion is connected to both the shorting bars 60 and 66 so as to be energized when the shorting bars receive a high signal. The movable contact 88 of the relay coil 86 is connected to a positive source of potential which is applied to a forward input of the drive unit when the coil is energized, and is otherwise applied to a reverse input when the coil 86 is deenergized. In the instant situation, the coil 86 is deenergized; therefore, the drive unit runs in reverse passing tape 10 from the reel 14 to the reel 12.

As the tape is driven from one reel to the other windows 22 pass between a light 90 and the photoelectric circuit 24 resulting in the production of position pulses in a conductor 92. The manner in which the logic circuit 26 accomplishes the pulses will be described below, however, they are applied to a pair of and gates 94 and 96 which are designated by a conventional symbol, and serve to pass the high state of a two level signal upon all inputs thereto being at a high level.

At the time under consideration, the and gate 94 is qualified as a result of receiving the positive signal through the switch 88 and a conductor 98. Therefore, the position pulse from the conductor 92 is applied to the coil 50, energizing the coil and upon the deenergization thereof moving the contacts 52 and 46 one step lower (numerically) in the step counter 30.

Of course, each window 22 passing through the sensing location results in a similar pulse, the trailing edge of which causes the contacts 52 and 46 to be moved to a lower number terminal. As the contacts are moved from the stationary terminal indicative of zero to that indicative of nine, the contact 52 brushes over the terminal 54 so as to receive a positive pulse which is applied to and gates 100 and 102. During this phase of operation, the and gate 102 is qualified through the conductor 104 to pass a pulse energizing coil 44 momentarily to step the contact 40 to a lower value terminal in the step counter 28. Thus, each time ten counts are stepped off by the step counter 30, one count is stepped off by the step counter 28, indicating the appropriate change in the tens digit.

At a time when the contact 40 reaches the terminal designated 50, the positive potential carried in the conductor 68 is applied through the movable-contact 58 of the step switch 32 and a conductor 106 to the movable contact 46 of the step counter 30. This action indicates that the tens digit is now correct; however, the ones digit may or may not be correct. In the situation under consideration, the ones digit indicated by the counter 30 would now be nine, as the counter just manifested a change in the tens digit. Therefore, the signal applied to the movable contact 46 is not applied to the bar 66 and would have no further effect. Therefore, the unit would continue searching for the desired tape section, stepping the counter 30 accordingly. When the contact 46 is stepped to the sixth position, the signal in the conductor 106 is applied to the shorting bar 66 energizing a conductor 108. Previously, the conductor 108 was at a low voltage level and it now goes to a high voltage level. Thereupon, a pulse passes through a capacitor 110 which resets the flip-flop 72 with the result that a high signal no longer appears in the conductor 74, and may not appear in the conductor 80 (considered below) so that the drive unit 20 is deenergized, stopping at the appropriate position identified by the section fifty-six.

The above example assumes the operation of the system to reverse the tape from the reel 12 to the reel 14, a similar mode of operation occurs when the direction of tape travel is forward. In such a situation, the shorting bars 60 or 66 are positioned to manifest by the position-indicating step counters 28 and 30. In such a situation, the shorting bars 60 or 66 receive a high signal which is applied to the coil 86 moving the contact 88 to engage the lower terminal with the result that the instruction to the drive unit 20 is to move to traverse the tape 22 in a forward direction. In this situation, signals from the logic circuit 26 which are applied to the and gates result in the qualification of gates 96 and 100 so as to advance the count of the step counters 28 and 30.

In a forward search, when the values manifest by the step switches come into coincidence with the values manifest by the step counters the signal level in the conductor 108 changes (drops to the low level) with the result that the flip-flop 72 is reset through the capacitor 110 and the drive unit 20 is stopped. As a result, it may be seen that a structurally simple system of the figure indicates the occurrence of a desired section and the direction to take to reach that section in a very effective and economical manner.

One of the difficulties of prior data-retrieval systems has been the precise control of the recording medium in accordance with index signals. For example, if windows in a recording medium are precisely sensed by a photoelectric circuit, drift of the tape or delay in response of the tape sometimes presents difficulty, as a mistake in locating data.

In order to avoid such difficulties, the present invention employs two sensing transducers, both of which must be energized to manifest the occurrence of a position signal, and which signal persists (as a pulse) so long as either remain energized. Thus by using the trailing edge of the position signal, the possibility of generating several signals as the medium oscillates relative a transducer is eliminated.

Considering this aspect of the present invention in detail, the light 90 develops position signal by passing through windows 22 spaced apart on the recording medium 10 to impinge upon photoelectric cells 112 and 114. The cathodes of photo cells 112 and 114 are connected to ground potential while the anodes are connected through separate similar resistors 116 and 118 to a source of positive potential. The junction points between the resistors and the photo cell anodes are then connected respectively to the control grids of triodes 120 and 122. The plate of the triode 120 is connected through a load resistor 124 to a source of positive potential and the plate of the triode 122 is connected to a similar load resistor 126 to a source of positive potential. The cathodes of the triodes 120 and 122 are connected to ground. The plates of the two triodes 122 and 120 are also each connected respectively through relay coils 128 and 130 to ground. These relay coils act on a relay switch 132 which is connected in series with a resistor 134 across the plates of the two triodes. Furthermore, the plate of the triode 122 is connected through a diode 136 to the output line 92, while the plate of the triode 120 is similarly connected through a diode 138.

The operation of the logic circuit 26 to provide an output pulse only upon the occurrence of both photocells 112 and 114 being operated, and terminate the pulse only upon the occurrence of both photocells being deenergized will now be considered in detail.

Normally, the voltage supply to the control grids of the tubes 120 and 122 through the resistors 116 and 118 is sufficient to maintain them in full conduction. However, upon the appropriate photocell sensing light to become conductive, the voltage on the associated control triode grid drops and the triode is cut off. Considering an example, assume both the photocells are dark, then the photocell 112 receives light. Thereupon, the triode 120 is cut off so that a voltage develops across the triode which is applied across the coil 128. However, the voltage applied across the coil 128 is insufficient alone to open the switch 132; therefore, the plate of the tube 122 with the result that the voltage at the plate 124 is held down. In fact, the voltage appearing at the plate of the tube 120 is insufficient to pass the diode 138 and provide an output from the circuit. Assume now the photocell 114 also is illuminated so that the triode 122 is also cut off. Thereupon, a substantial voltage increase develops across the resistor 134, which is applied to both the relay coils 128 and 130 and is sufficient to open the switch 132. Now, as the medium or tape 10 oscillates or perhaps moves with a drifting motion, one or the other of the photocells 112 and 114 may become dark; however, the output from the logic circuit 26 will remain high until both the photocells are dark whereupon the switch 132 is closed. This occurs because if either of the triodes 120 or 122 is rendered conducting, the voltage across the associated coil 128 or 130 is lost; however, the other coil provides sufficient flux to hold the switch 132 open. Upon both the photocells becoming dark, both the triodes 120 and 122 again conduct and the switch 132 is permitted to open so that the output from the logic circuit goes low. As indicated above, it is the trailing edge of this output pulse upon which decisive action is taken; therefore, a precise instant is manifest.

In the operation of the sensing circuit and logic circuit as described above, there is a possibility that a window may stop over the photoelectric cells so the tape 10 would otherwise reverse its direction of travel. Upon such an occurrence, the trailing edge of the pulse would be formed to infer the tape had proceeded past the window in the original direction of travel. To avoid such an occurrence, the system incorporates a structure to assure movement in a particular direction until a position pulse has been properly formed. This objective is simply accomplished in the present system by a connection 140 passing from the conductor 92 to the or gate 76. In function, if the system is ordered to stop through another command, so long as the output from the logic circuit 26 is high (indicating a pulse is being developed) that high output is applied through the connection 140 and the gate 78 to instruct the drive unit 20 to continue operation.

Of course, the system must also continue in the same direction of travel, and in this regard, it is noted that the forward and reverse signals applied to the drive unit are effective only on starting. Therefore, until the unit stops, charges in these signals have no effect.

As a result of the combined aspects of the described features, the present invention provides a very accurate information retrieval apparatus, well suited to searching tape or various other recording medium in which information is recorded in serial form.

It should be noted that the particular embodiment of the invention described is fully capable of providing the advantages and achieving the objects set forth, such embodiment is merely illustrative and this invention is not limited to the details of construction illustrated and described herein except as defined by the appended claims.

What is claimed is:

1. A system for locating a predetermined position of a recording medium, said medium incorporating means to provide position signals indicative of position change, comprising: a drive means energizable to move said recording medium progressively from one position to another; at least one step switch means settable to indicate said predetermined position of the recording medium and including interconnect means to progressively interconnect plural stages thereof in accordance with the state of said step switch means; at least one step counter means connected to receive said position signals to manifest the instant position of said recording medium; and connecting means connecting said step counter means to said step switch means to apply signals to said step switch means, whereby a signal level change in said interconnect means of said step switch means indicates said predetermined position to deenergize said drive means.

2. A system according to claim 1 wherein said recording medium comprises magnetic tape having signal-generating marks thereon to provide said position signals, and wherein said drive means comprises means for driving said magnetic tape past a sensing location.

3. A system according to claim 1 wherein said step switch means comprises plural electrical terminals and means for progressively shorting said terminals in accordance with the state of said switch.

4. A system according to claim 3 wherein said step counter means comprises an electromechanical counter including a plurality of stationary terminals and a movable terminal adapted to be connected to a source of electrical potential.

5. A system for locating a predetermined position of a recording medium, said medium incorporating means to provide position signals indicative of position change, comprising: a drive means energizable to move said recording medium progressively from one position to another; a plurality of step switches settable to a number of states coinciding to the radix of the system of numbers employed, and each including interconnect means to progressively interconnect plural stages thereof in accordance with the state of each switch, said switches for indicating said predetermined position on said tape; first connecting means for interconnecting a stage offset relative the interconnect means of higher-order of said step switches to the interconnect means of lower-order of said interconnect means; a like plurality of step counters operable to a number of states coinciding to the radix of the system of numbers employed, for manifesting the current position of said recording medium in accordance with received position signals; and second connecting means connecting said step counters respectively to said step switches, whereby a signal level change in each of said interconnect means indicates said predetermined position to deenergize said drive means.

6. A system for locating a predetermined position of a recording medium, said medium incorporating means to provide position signals indicative of position change, comprising: a drive means energizable to move said recording medium progressively from one position to another; a plurality of step switches settable to a number of states coinciding to the radix of the system of numbers employed, and each including interconnect means to progressively interconnect plural stages thereof in accordance with the state of each switch, said switches for indicating said predetermined position on said tape; first connecting means for interconnecting a stage offset relative the interconnect means of higher-order of said step switches to the interconnect means of lower-order of said interconnect means; a like plurality of step counters operable to a number of states coinciding to the radix of the system of numbers employed, for manifesting the current position signals; and second connecting means connecting said step counters respectively to said step switches, and to said drive unit, whereby the signal level from each of said interconnect means controls the direction in which said drive means moves said medium, and upon a change in said signal level, said drive means is stopped.

7. A system for locating a predetermined position of a recording medium, said medium containing spaced-apart signal indications, comprising: offset first and second transducers for sensing said signal indications at a sense location; logic means for providing a position signal exclusively upon said first and second transducers concurrently sensing a signal indication and sensing the passage of said sense signal; a drive means energizable to move said recording means progressively from one position to another; at least one step switch means settable to indicate said predetermined position of the recording medium and including interconnect means to progressively interconnect plural stages thereof in accordance with the state of said switch means; at least one step counter means connected to receive said position signals to manifest the position of said recording medium; and connecting means connecting said step counter means to said step switch means to apply signals to said step switch means, whereby a signal level change in said interconnect means of said step switch means indicates said predetermined position to deenergize said drive means.

8. A system according to claim 7 further including means to preserve said drive means energized after said first and second transducers concurrently sense a signal indication, until said signal indication is sensed to have passed.

References Cited

UNITED STATES PATENTS

| | | | |
|---|---|---|---|
| 2,733,425 | 1/1956 | Williams et al. | 340—174.1 |
| 2,782,398 | 2/1957 | West et al. | 340—174.1 |
| 3,209,340 | 9/1965 | Pingry | 340—174.1 |

TERRELL W. FEARS, *Acting Primary Examiner.*

BERNARD KONICK, *Examiner.*

A. I. NEUSTADT, *Assistant Examiner.*